United States Patent [19]

Yasuda et al.

[11] Patent Number: 4,923,206
[45] Date of Patent: May 8, 1990

[54] TROLLEY TRANSFER UNIT FOR TUNNEL FURNACE

[75] Inventors: Keiji Yasuda, Aichi; Kazuhiro Miyahara, Nagoya, both of Japan

[73] Assignee: NGK Insulators, Ltd., Japan

[21] Appl. No.: 330,902

[22] Filed: Mar. 31, 1989

[30] Foreign Application Priority Data

Mar. 31, 1988 [JP] Japan .............................. 63-42125[U]

[51] Int. Cl.$^5$ .............................................. B60D 1/04
[52] U.S. Cl. ................................... 280/504; 280/491.5; 280/508; 403/167
[58] Field of Search ................... 280/491.1, 491.5, 474, 280/491.3, 504, 508; 104/162, 244; 403/167, 168; 114/230, 249, 250; 244/1 TD

[56] References Cited

U.S. PATENT DOCUMENTS

| 2,760,789 | 8/1956 | Wampler | 280/491.5 |
| 2,968,491 | 1/1961 | Wilson | 280/79.11 |
| 4,017,673 | 4/1977 | Michels et al. | 13/7 |
| 4,176,852 | 12/1979 | Collin | 280/491.5 |
| 4,243,385 | 1/1981 | Jeffries, Jr. | 432/241 |
| 4,509,769 | 4/1985 | Weber | 280/491.11 |
| 4,560,350 | 12/1985 | Doby | 432/241 |

FOREIGN PATENT DOCUMENTS 162641 3/1949 Austria .
1483129 3/1969 Fed. Rep. of Germany .

Primary Examiner—Charles A. Marmor
Assistant Examiner—Eric Culbreth
Attorney, Agent, or Firm—Arnold, White & Durkee

[57] ABSTRACT

A trolley transfer unit for a tunnel furnace is to be used between trolleys when ceramic sintered products are loaded onto and unloaded from the trolleys in sintering the products in the tunnel furnace. The trolley transfer unit comprises a bar member for connecting the two trolleys with a predetermined interval, protrusions provided at both ends of the bar member for engaging the trolleys to be connected, and a support bar secured to the bar member and engaging a frame of the other trolley to support the bar member.

4 Claims, 2 Drawing Sheets

FIG_1
PRIOR ART
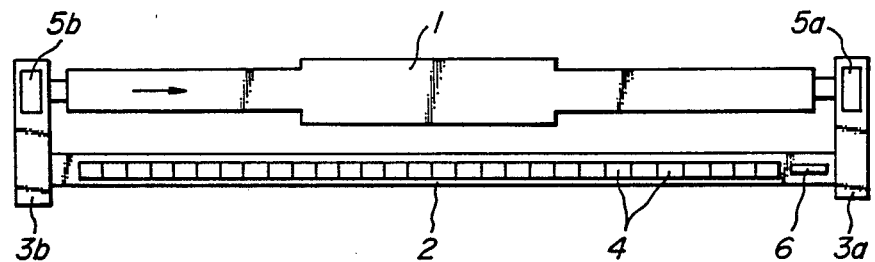
FIG_2
PRIOR ART
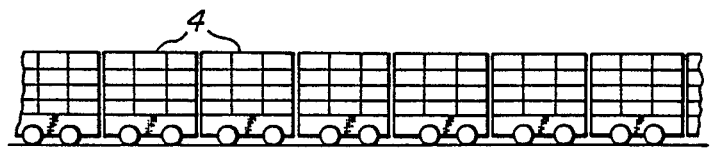
FIG_5
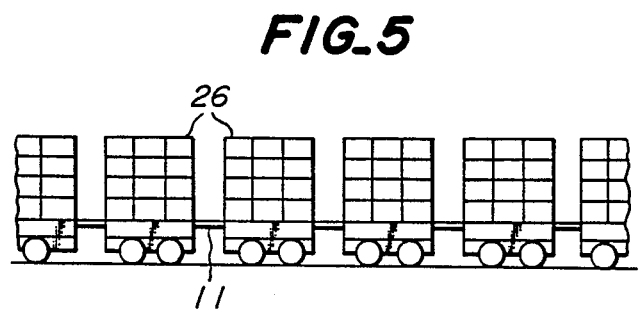

FIG._3
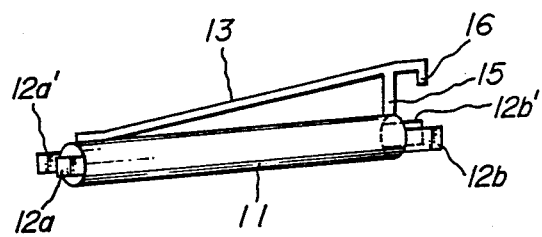
FIG._4
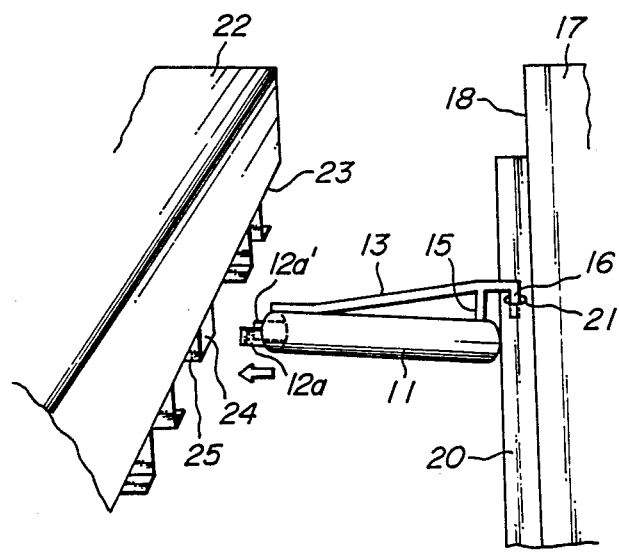

TROLLEY TRANSFER UNIT FOR TUNNEL FURNACE

BACKGROUND OF THE INVENTION

This invention relates to a trolley transfer unit for a tunnel furnace, and more particularly to a transfer unit to be used between trolleys when ceramic sintered products are loaded onto or unloaded from trolleys.

As shown by way of example in FIG. 1, with a trolley transfer system for a tunnel furnace hitherto used, there is provided a tunnel furnace 1 for sintering products, a return track 2 in parallel with the tunnel furnace 1 and connecting passages 3a and 3b. After removal of sintered products from trolleys 4 used for sintering the products in the tunnel furnace 1 according to a predetermined schedule, the trolleys are transferred to the return track 2 by means a transfer car 5a in the connecting passage 3a. The transferred trolleys 4 are progressively forced into the entrance of the return track 2 by means of trolley feeding means 6 so that a predetermined number of the trolleys 4 are gathered together in the return track 2. On the other hand, on an exit side of the return track 2 the trolleys are forced out of the return track 2 into the connecting passage 3b one by one every time when one trolley 4 is forced into the return track 2. The trolley 4 forced into the connecting passage 3b is transferred toward the tunnel furnace 1 by means of a transfer car 5b. The transferred trolleys 4 are progressively forced into an entrance of the tunnel furnace 1 by means of trolley feeding means (not shown). The trolleys in the tunnel furnace 1 and the return track 2 are closely gathered in an end-to-end relation always to keep constant numbers of the trolleys 4 in the furnace and return track, respectively.

In the trolley transfer system described above, since the trolleys 4 are gathered and connected from the entrance to the exit of the return track 2, the system encounters the following disadvantages.

1. There is no clearance between the trolleys. Therefore, it is difficult if not impossible for operators to move through clearances between the trolleys.

2. It is required to provide the trolleys 4 in the return track 2 in the same number as that of the trolleys 4 in the tunnel furnace 1.

3. In case a problem occurs in the lower portion of the trolley 4 in the return track 2, it is impossible to repair the troubled portion of the trolley at the location.

4. In the event that refractory bricks constituting the trolley are damaged, the damaged trolley, often improperly urges the preceding trolley so that refractory bricks of the preceding trolley are damaged and positions of the shelf assembly are shifted.

SUMMARY OF THE INVENTION

It is an object of the invention to provide an improved trolley transfer unit for a tunnel furnace, which eliminates the disadvantages of the prior art described above and can transfer trolleys with high efficiency.

In order to achieve this object, a trolley transfer unit for a tunnel furnace according to the invention comprises a bar member for connecting two trolleys with a predetermined interval, at least one engaging means provided on° at least one end of the bar member for engaging one of several trolleys to be connected, and a support bar secured to said bar member and engageable with the other trolley to support said bar member.

According to the invention, the engaging means or protrusions provided at one end of the bar member engage a connecting portion of one of trolleys to be connected and the support bar engages a frame of the trolley to support the bar member. Therefore, the unit is first connected to one trolley to support the unit by the trolley and second the trolley is caused to approach the other trolley so that the other protrusions on the side of the other trolley engage the connecting portion of the other trolley to connect the two trolleys.

When, for example, trolleys in a return track are successively connected in the manner as described above, the trolleys are spaced from each other by predetermined distances to provide spaces between the trolleys. Therefore, operators can pass across a series of the trolleys and the number of the trolleys in the return track can be reduced.

Moreover, when a problem in one trolley in the return track occurs, the transfer units associated with the troubled trolley and adjacent trolleys are removed to enlarge the spaces forward and rearward of the troubled trolley. Therefore, repairing is readily effected at the location.

In order that the invention may be more clearly understood, preferred embodiments will be described, by way of example, with reference to the accompanying drawings.

BRIEF DESCRIPTION OF THE DRAWINGS

FIG. 1 is a schematic view illustrating a trolley transfer system of the prior art for use in a tunnel furnace;

FIG. 2 is a schematic view illustrating a condition of trolleys in a return track according to a prior art;

FIG. 3 is a perspective view illustrating one embodiment of the trolley transfer unit according to the invention;

FIG. 4 is an explanatory view illustrating mounting the unit onto trolleys according to the invention; and FIG. 5 is a schematic view illustrating mounted units according to the invention on trolleys in a return track.

DETAILED EXPLANATION OF THE PREFERRED EMBODIMENTS

FIG. 3 is a perspective view illustrating one embodiment of the trolley transfer unit for a tunnel furnace according to the invention. The unit comprises a bar member 11 made of a metal, two pairs of protrusions 12a, 12a', 12b and 12b' one pair provided at each end of the bar member 11 for embracing sides of connecting portions at lower parts of trolleys, and a support bar 13 for horizontally supporting the bar member 11. The bar member 11 has a sufficient strength to resist urging forces from the trolleys. So long as such requirement for strength is fulfilled, the bar member 11 may be hollow instead of a solid cylindrical shape as shown.

In this embodiment, the two pairs of protrusions are provided at both the ends of the bar member 11. However, other constructions may be used so long as they can maintain the trolleys in a predetermined distance. For example, the connecting portions may be formed with apertures into which the protrusions may be adapted to be fitted or only one protrusion may be formed in the bar member to be inserted into an aperture formed in the connecting portion of the trolley. It is only required to engage parts of the two trolleys.

The support bar 13 has one end connected to an upper portion of the bar member 11 and extends therefrom toward the other end upwardly, at a slight angle.

A vertical bar 15 of the support bar 13 has its ends connected to the other end of the support bar 13 and the upper portion of the bar member 11, respectively. A bent portion 16 of the support bar 13 extends from the connecting portion of the support bar 13 and the vertical bar 15 so as to be engaged with or fitted in an aperture 21 of a frame 20 of either of trolleys to be connected.

When the protrusions 12b and 12b' embrace the sides of the connecting portion at the lower part of one trolley and the bent portion 16 of the support bar 13 engages with or fitted in the frame of the other trolley, the bar member 11 is maintained horizontally even if the protrusions 12a and 12a' do not embrace the sides of the connecting portion at the lower part of the other trolley. In operation of the unit, therefore, after the unit is connected to one trolley, the unit is also connected to the other trolley by moving the other trolley.

FIG. 4 illustrates the connecting operation of the unit to two trolleys. The protrusions 12b and 12b' embrace the sides of the connecting portion (not shown) provided at the lower portion of the rear trolley, while the bent portion 16 of the support bar 13 is fitted in the aperture 21 of the frame 20 so that the bar member 11 is maintained horizontally in conjunction with the actions of the protrusions and the bent portion. Thereafter, the rear trolley is pushed forward to approach the preceding trolley so that the protrusions 12a and 12a' engage and embrace the sides 25 of the connecting portion 24 of the preceding trolley.

The preceding and rear trolleys 22 and 17 are thus connected with a predetermined distance in this manner. The connecting operation of trolleys in a return track by means of the units is shown in FIG. 5. Reference numeral 26 denotes the trolleys.

It will be of course understood that various changes and modifications may be made in the invention without limiting the invention to the above embodiments.

As can be seen from the above explanation, according to the invention the following advantages are obtained by connecting trolleys with predetermined distances by means of the bar members horizontally supported by support bars, respectively.

1. There are spaces between trolleys in a return truck so that operators can pass across a series of the trolleys.

2. Since the trolleys are arranged with predetermined intervals, the number of trolleys in a return track can be reduced.

3. When a trouble takes place in one trolley among the trolleys in the return track, spaces on forward and rearward sides of the troubled trolley can be enlarged by removing the trolley transfer units associated with the troubled and adjacent trolleys so that repairing the troubled trolley can be readily carried out at the location.

What is claimed is:

1. A trolley transfer unit for a tunnel furnace, comprising:
    a bar member for joining two trolleys at a predetermined interval, said bar member having a first end and a second end;
    engaging means for engaging one of said trollies to be joined, said engaging means being provided on at least said second end of said bar member; and
    a support bar having a first end connected to the first end of said bar member via a vertical member having one end connected to said bar member and another end connected to said support bar and a second end connected to the second end of said bar member, said first end of said support bar having a bent portion extending therefrom which engages the other one of said trollies to be joined.

2. The trolley transfer unit of claim 1, further comprising engaging means for engaging the other one of said trollies to be joined, said engaging means being provided on said 3. The trolley transfer unit of claim 2, wherein said engaging means comprises two protrusions provided at each end of said bar member, and said bar member is supported by said support bar engaging the other one of said trollies to be joined, and the two protrusions provided at said second end of said bar member and engaging a frame of said one of said trollies.

4. The trolley transfer unit of claim 1, wherein said bent portion includes a vertical portion which is fitted into an aperture in a frame of the other one of said trollies to be joined.

* * * * *